United States Patent [19]

Kameyama et al.

[11] Patent Number: 5,076,963
[45] Date of Patent: Dec. 31, 1991

[54] PASTES FOR FORMING A LUMINESCENT LAYER AND INSULATOR LAYER OF ELECTROLUMINESCENT ELEMENT AND ELECTROLUMINESCENT ELEMENT USING SUCH PASTES

[75] Inventors: Akinori Kameyama, Iwaki; Jun Wada, Wako; Yutaka Nakabayashi, Kyoto, all of Japan

[73] Assignees: Nippon Kasei Chemical Co., Ltd, Fukushima; Nitto Denko Corporation, Osaka, both of Japan

[21] Appl. No.: 513,959

[22] Filed: Apr. 24, 1990

Related U.S. Application Data

[63] Continuation-in-part of Ser. No. 263,165, Oct. 27, 1988.

[30] Foreign Application Priority Data

| Oct. 30, 1987 | [JP] | Japan | 62-275494 |
| Oct. 30, 1987 | [JP] | Japan | 62-275495 |
| Jul. 29, 1988 | [JP] | Japan | 63-190198 |

[51] Int. Cl.$^5$ ............................ C09K 11/08; H01J 1/62
[52] U.S. Cl. ........................ 252/301.36; 252/301.4 R; 313/502
[58] Field of Search ............... 252/301.33, 301.34, 252/301.35, 301.36; 313/502, 509

[56] References Cited

U.S. PATENT DOCUMENTS

| 3,213,341 | 10/1965 | Scotti | 428/463 |
| 3,214,622 | 10/1965 | D'Errico | 313/502 |
| 3,238,407 | 3/1966 | Jaffe | 427/66 |
| 3,248,588 | 4/1966 | Blazek et al. | 313/509 |
| 3,315,111 | 4/1967 | Jaffee | 313/503 |
| 3,330,981 | 7/1967 | Aia | 313/474 |
| 3,379,915 | 4/1968 | Sentementes et al. | 313/509 |
| 4,097,776 | 6/1978 | Allinikov | 427/66 |
| 4,458,177 | 7/1984 | Hunter et al. | 313/503 |
| 4,513,023 | 4/1985 | Wary | 427/66 |
| 4,560,902 | 12/1985 | Kardon | 313/502 |
| 4,684,353 | 8/1987 | deSouza | 445/51 |
| 4,771,085 | 9/1988 | Lazaridis | 522/77 |

FOREIGN PATENT DOCUMENTS

| 0129286 | 7/1984 | Japan . |
| 61-161691 | 7/1986 | Japan . |
| 61-28438 | 11/1986 | Japan . |
| 61-268437 | 11/1986 | Japan . |
| 62-18254 | 1/1987 | Japan . |
| 62-51192 | 3/1987 | Japan . |
| 62-264593 | 11/1987 | Japan . |
| 63-216291 | 9/1988 | Japan . |

Primary Examiner—Prince Willis, Jr.
Assistant Examiner—Thomas Steinberg
Attorney, Agent, or Firm—Nixon & Vanderhye

[57] ABSTRACT

The present invention discloses an electroluminescent element comprising spherical spacer particles in a luminescent layer having a dielectric constant of not less than 10 at 1 KHz and 25° C. and an insulator layer having a dielectric constant of not less than 10 at 1 KHz and 25° C. which both layers are disposed between a transparent electrode and a back electrode, either of said luminescent layer or of said insulator layer having been produced by forming a phosphor paste layer or an insulative paste layer and solidifying each with radiation, respectively.

4 Claims, 1 Drawing Sheet

PASTES FOR FORMING A LUMINESCENT LAYER AND INSULATOR LAYER OF ELECTROLUMINESCENT ELEMENT AND ELECTROLUMINESCENT ELEMENT USING SUCH PASTES

CROSS-REFERENCE TO RELATED APPLICATION

The present invention is a continuation-in-part application of U.S. patent application, Ser. No. 263,165 filed on Oct. 27, 1988.

BACKGROUND OF THE INVENTION

The present invention relates to a phosphor paste and an insulative paste used for forming a luminescent layer or an insulator layer, respectively, of an electroluminescent (EL) element, and to an EL element having a luminescent layer or an insulator layer formed from said pastes by solidifying them with radiation.

An EL element comprises a luminescent layer formed by dispersing a pulverized EL phosphor in a binder made of an inorganic or organic material. The basic structure of EL element of AC driving system comprises an insulator layer (this layer is used to insulate electrically a transparent electrode and a back electrode) and a luminescent layer sandwiched between a back electrode and a transparent electrode across which a sine-wave AC or bipolar pulse voltage is applied so that the luminescent layer is placed under the action of a strong electric field to produce luminescence, which is emitted as light through the transparent electrode. Such EL element of AC driving system include the ones, though only rarely used, in which a luminescent layer alone is placed between the back and transparent electrodes.

When an organic material is used not only for the binder forming the luminescent or insulator layers of EL element but also for the transparent electrode and protective layer, it is possible to obtain an EL element which is thin, light in weight and high in impact strength and also has good flexibility.

The conventional method for producing said EL element of AC driving system comprises the step of applying an insulative paste mainly composed of a pulverized inorganic high dielectric substance such as barium titanate and a solidifiable compound to form an insulative paste layer, the step of applying a phosphor paste mainly composed of pulverized EL phosphor and a solidifiable compound to form a phosphor paste layer, and the step of solidifying said paste layers to thereby form an insulator layer and a luminescent layer. Regarding the way of effecting said solidification, there are known only two methods: solvent drying and heat setting.

In the case of the solvent drying type paste, a soluble polymer obtainable by polymerizing a monomer such as acrylic esters, epoxy resin, etc., or a cyanoethylated compound is used as binder. Said soluble polymer or cyanoethylated compound are solid or a viscous liquid, so that they need to be dissolved in a solvent for dispersing a pulverized phosphor therein.

In the case of the heat setting type paste, a heat curable compound resin is used as binder.

In the conventional method for producing EL element as described above, solvent drying or heat setting is required for forming an insulator layer or a luminescent layer, and such heating step, either drying or setting, takes about one to two hours. Also, in order to form the insulator layer or luminescent layers of a desired thickness, the application and drying operations or the application and setting operations may be required to repeat several times. Therefore, it is desired to shorten the solidification step. Further, the cyanoethylated compounds generally used as binder tend to be colored when exposed directly to the air under a high temperature condition for a very long time. This would reduce brightness of light emitted by the EL element and change the color of light emitted. Accordingly, it is desired to shorten even a little the time required for the solidification.

As an EL element using compound solidifiable by radiation, U.S. Pat. No. 4,513,023 discloses "a thin electroluminescent lamp assembly comprising forming a UV curable dielectric matrix by loading non-encapsulated particles of electroluminescent phosphor into a UV curable dielectric composition, depositing a coating of such composition over the surface of a transparent conductor, curing such composition by exposure to ultra-violet light in a substantially inert atmosphere," and "The phosphor particles may be loaded into any conventional UV curable dielectric composition such as, for example, the UV curable dielectric 5011D which is available from the Dupont Co. Inc. of Delaware U.S.A.".

The UV curable dielectric 5011D has a dielectric constant of less than 5 at 1 KHz and 25° C.

The present inventors have devised a new way of solidification utilizing radiation instead of the conventional solvent drying or heat setting type solidification techniques in the production of EL element. Further, the present inventors found that in a preparation of EL element, it is not always necessary to use an insulative paste and a phosphor paste solidifiable by radiation in order to form both an insulator layer and luminescent layer, and the disadvantage of conventional preparation method can be markedly decreased when the insulative or the phosphor paste solidifiable by radiation is used for either of insulator layer or of luminescent layer.

SUMMARY OF THE INVENTION

An object of the present invention is to provide a phosphor paste having a dielectric constant of not less than 10 at 1 KHz and 25° C. after being solidified for forming a luminescent layer of EL element, which paste is characterized in that it comprises as main components a pulverized EL phosphor, an organic high dielectric substance and at least one compound solidifiable by radiation.

Another object of this invention is to provide a phosphor paste having a dielectric constant of not less than 10 at 1 KHz and 25° C. after being solidified for forming a luminescent layer of EL element, comprising as a main components a pulverized EL phosphor and at least one compound solidifiable by radiation, at least one of such radiation-solidifiable compounds being a compound (A) which shows a high dielectric constant of not less than 10 at 1 KHz and 25° C. after being solidified.

Still another object of this invention is to provide an insulative paste having a dielectric constant of not less than 10 at 1 KHz and 25° C. after being solidified for forming an insulator layer of EL element, comprising as a main components at least one high dielectric substance selected from pulverized inorganic high dielectric and organic high dielectric substances and at least one compound solidifiable by radiation.

Yet another object of this invention is to provide a high dielectric paste having a dielectric constant of not less than 10 at 1 KHz and 25° C. after being solidified for forming an insulator layer of EL element, comprising as a main components at least one compound solidifiable by radiation, at least one of such radiation-solidifiable compounds being a compound (B) which shows a high dielectric constant of not less than 10 at 1 KHz and 25° C. after being solidified.

A further object of this invention is to provide an EL element comprising a transparent electrode, a luminescent layer having a dielectric constant of not less than 10 at 1 KHz and 25° C. and an insulator layer having a dielectric constant of not less than 10 at 1 KHz and 25° C. and a back electrode, said luminescent layer and insulator layer being disposed between said transparent electrode and said back electrode, and either of said luminescent layer or said insulator layer having been produced by forming a phosphor paste layer or an insulative paste layer and solidifying each with radiation, respectively.

DETAILED DESCRIPTION OF THE INVENTION

Phosphor Paste For Forming Luminescent Layer

Figure 1:
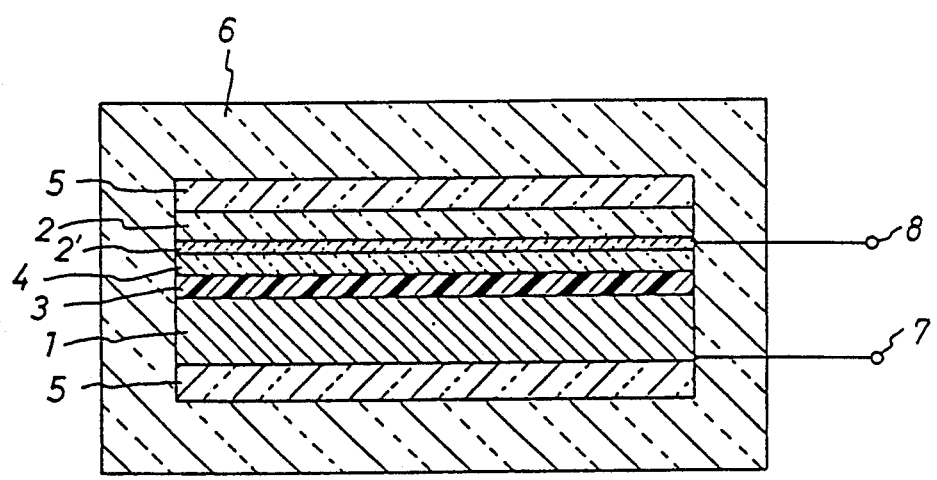
FIG. 1 is a sectional view of an EL element of AC driving system according to this invention, produced by using a phosphor paste or an insulative paste for forming a luminescent layer or an insulator layer of said EL element.

The phosphor paste having a dielectric constant of not less than 10 at 1 KHz and 25° C. after being solidified for forming a luminescent layer in an EL element according to this invention comprises as a main components either of (1) a pulverized EL phosphor, an organic high dielectric substance and at least one compound solidifiable by radiation or of (2) a pulverized EL phosphor and at least one compound solidifiable by radiation, at least one of such radiation-solidifiable compounds being compound (A) showing a high dielectric constant of not less than 10 at 1 KHz and 25° C. after being solidified.

Any of the generally used EL phosphors in powdery form can be used in this invention. For example, a powder of zinc sulfide added with an activator such as copper or manganese or a co-activator such as chlorine, bromine or aluminum can be used. Preferred examples of such pulverized phosphor are (ZnS; Cu, Cl), (ZnS; Cu, Br), (ZnS; Cu, Al), or (ZnS; Mn, Cl), etc.

The organic high dielectric substance used in this invention is preferably one having a dielectric constant of not less than 10 (at 1 KHz and 25° C.). Preferred examples of such substances are cyanoethylated compounds such as cyanoethylated ethylene-vinyl alcohol copolymer, cyanoethylated poval, cyanoethylated dihydroxypoval, cyanoethylated cellulose, cyanoethylated hydroxyalkyl cellulose, cyanoethylated hydroxyethyl cellulose, cyanoethylated pullulan, cyanoethylated dihydroxypullulan, cyanoethylated starch, cyanoethylated saccharose, cyanoethylated amylose, cyanoethylated sorbitol, cyanoethylated pentaerythritol, cyanoethylated mannitol, cyanoethylated methyl glucose, cyanoethylated trimethylolpropane, cyanoethylated glycerin, cyanoethylated diglycerin, cis-3,6-endomethylene 1, 2, 3, 6 tetrahydrophthalic acid dicyanoethyl ester, cyanoethylated thioglycol, etc., fluoropolymers such as trifluoroethyl vinyl ether polymer, vinylidene fluoride-hexafluoropropylene copolymer, polyvinylidene fluoride, and nitrile compounds such as succinonitrile, butadiene-acrylonitrile rubber, phthalonitrile, etc. Among them, cyanoethylated compounds are preferred.

As the compound solidifiable by radiation, there can be used in this invention any of the compounds which are solidified upon exposure to radiation. Such compounds may or may not show a high dielectric constant after being solidified. Mixtures of such compounds are also usable.

When the term "solidification" is used in this invention, it denotes a state in which a substance is kept solid at 120° C. or below.

Examples of said compounds are monomers, oligomers and prepolymers having carbon-carbon double bonds such as (meth)acrylic compounds such as epoxy (meth)acrylate, urethane (meth)acrylate, (meth)acryl-modified polybutadiene, silicon (meth)acrylate, polyester (meth)acrylate, trimethylolpropane tri(meth)acrylate, neopentyl glycol di(meth)acrylate, hexanediol diacrylate, 2-hydroxyethyl (meth)acrylate, 2-methoxyethyl (meth)acrylate, etc., unsaturated polyester, styrene, vinyl acetate and N-vinylpyrrolidone, etc. These compounds may be mixed in proper combinations. As the compound (A) showing a high dielectric constant of not less than 10 at 1 KHz and 25° C. after being solidified and solidifiable by radiation, there can be cited and preferably used the (meth)acrylic ester derivatives having a cyanoalkyl group such as 2-cyanoethyl (meth)acrylate and 3-cyanopropyl (meth)acrylate, (meth)acrylic ester derivatives having a cyanoalkoxylalkyl group such as 2-(2-cyanoethoxy)ethyl (meth)acrylate, 2-(2-(2-cyanoethoxy) ethyl (meth)acrylate and 2-hydroxy-3-(2-cyanoethoxy) propyl (meth)acrylate, and (meth)acrylic acid amide derivatives having a cyanoalkyl group such as N-N-bis(2-cyanoethyl) (meth)acrylamide and N-methylol-N-cyanoethyl (meth)acrylamide. The term "(meth)acrylate" represents either methacrylate or acrylate.

The term "radiation" used in this invention refers to electron beam, ultraviolet rays and the like. These radiations may be used either singly or in combination. It is possible to apply ultraviolet ray and electron beam in that order.

The phosphor paste can be obtained by mixing a pulverized EL phosphor such as mentioned above, an organic high dielectric substance and at least one compound solidifiable by radiation (which may be a compound showing or not showing a high dielectric constant after being solidified or may be a mixture of such compounds) as binder, well dispersing them and defoaming the mixture (method 1).

Use of an organic high dielectric substance has the advantage of not only increasing the dielectric constant of the binder but also allowing adjustment of viscosity of the binder to facilitate its application. Said paste is also obtainable by mixing a pulverized EL phosphor and at least one compound solidifiable by radiation (at least one of the radiation-solidifiable compounds being a compound (A) showing a high dielectric constant after being solidified) as binder, well dispersing them and defoaming the mixture (method 2).

As for the mixing ratio of pulverized phosphor and binder, usually phosphor is used in an amount of 150–800 parts by weight to 100 parts by weight of binder, preferably 250–450 parts by weight, more preferably 300–400 parts by weight to 100 parts by weight of binder. The amount of the compound showing a high dielectric constant (organic high dielectric substance, compound showing a high dielectric constant after being solidified or the sum of said compound and organic high dielectric substance) in the binder is preferably 10 to 100% by weight, more preferably 50 to 100% by weight based on the binder. The amount of the organic high dielectric substance used is preferably 70 to 100% by weight based on said binder.

Such paste may contain a spacer, a photosensitizer and/or other additives.

Spacer serves for maintaining constantly the thickness of the luminescent layer of EL element. Such spacer is made of a material selected from epoxy resin, polystyrene resin, nylon resin, glass and the like, the particle size thereof being in the range of 10 to 50 $\mu$m, preferably 20 to 40 $\mu$m. The amount of such spacer added is 2% by weight or less, preferably 0.5 to 2.0% by weight based on the EL phosphor such as zinc sulfide.

Typical examples of photosensitizer usable in the paste of this invention are benzoinisopropyl ether, 1-hydroxy-cyclohexyl-phenyl ketone (Irgacure 184 produced by Ciba Geigy Inc.), 2-hydroxy-2-methyl-1-phenylpropane-1-one (DAROCURE 1173 produced by Merk and Co. Inc.) and benzyldimethylketal (Irgacure 651 produced by Ciba Geigy Inc.) etc.

The amount of such photosensitizer added is usually 0.5 to 5% by weight, preferably 2 to 5% by weight based on the radiation-solidifiable compound.

Insulative Paste For Forming Insulator Layer

The insulative paste for forming an insulator layer in the EL element according to this invention comprises as a main components either of (3) at least one high dielectric substance selected from pulverized inorganic high dielectric substances and organic high dielectric substances and at least one compound solidifiable by radiation or of (4) at least one compound solidifiable by radiation, at least one of such radiation-solidifiable compounds being compound (B) showing a high dielectric constant of not less than 10 at 1 KHz and 25° C. after being solidified.

In the paste of composition (3), the compound solidifiable by radiation may or may not be one showing a high dielectric constant (not less than 10 at 1 KHz and 25° C.) after being solidified. A mixture of such compounds is also usable. In the paste of composition (4), there can be used a single compound showing a high dielectric constant after being solidified and solidifiable by radiation, or a mixture of such compound with other compound not showing a high dielectric constant after being solidified but solidifiable by radiation.

The paste of composition (3) can be obtained by mixing and well dispersing a high dielectric substance in a radiation-solidifiable compound and defoaming the mixture. The paste of composition (4) can be obtained by simply defoaming a radiation-solidifiable compound or a mixture of such compounds.

As the pulverized inorganic high-dielectric substance, there can be used those which have been commonly employed in the art, but barium titanate, lead titanate, strontium titanate and the like are preferred. As for the organic high dielectric substance and radiation-solidifiable compound, those employed in the phosphor paste for forming a luminescent layer can be used. As compound B, the compounds used in compound A are used, too. Regarding the mixing ratio of inorganic high dielectric substance to binder, the former is used in an amount of usually 200 to 700 parts by weight, preferably 300 to 500 parts by weight to 100 parts by weight of binder. The ratio of the dielectric substance (inorganic or organic high dielectric substance or the total of such substance and the compound showing a high dielectric constant after being solidified) in the whole paste composition is preferably 10 to 100% by weight, more preferably 50 to 100% by weight. The amount of the organic high dielectric substance used is preferably 70 to 100% by weight based on the binder.

Such paste may contain a suitable amount of a sensitizer as in the paste for forming a luminescent layer described above. The amount of such sensitizer added is usually 0.5 to 5% by weight, preferably 3 to 5% by weight based on the radiation-solidifiable compound.

Conventional Phosphor Paste and Conventional Dielectric Paste Solidifiable by Heating As a conventional phosphor paste and conventional insulative paste solidifiable by heating used in this invention, a solvent drying type paste and heat setting paste type are available.

In the case of the solvent drying type paste, a soluble polymer obtainable by polymerizing a polymerizable monomer such as acrylic esters, epoxy resin, etc., or a cyanoethylated compound is used as binder. Usually, cyanoethylated compounds are favorably used as binder. Cyanoethylated compounds can be obtained by the Michael addition of acrylonitrile with hydroxyl group contained in polyol such as saccharides, polyhydric alcohols or hydroxy-containing polymers. Typical examples of such cyanoethylated compounds are cyanoethylated poval, cyanoethylated pullulan, cyanoethylated cellulose, cyanoethylated saccharose and cyanoethyl-hydroxyethylated cellulose. Said cyanoethylated compounds are solid or a viscous liquid, so that they need to be dissolved in a solvent for dispersing a pulverized phosphor or high dielectric substance therein. As solvent, there can be used dimethyl-formamide, N-methylpyrrolidone, methylethylketon, acetonedimethyl-formamide mixture, and the like.

Thus, a solvent drying type phosphor paste comprises as main component a pulverized EL phosphor, a solvent and above-mentioned binder dissolved in a solvent, and a solvent drying type insulative paste comprises as main component at least one high dielectric substance selected from pulverized inorganic high dielectric substances and organic high dielectric substances a solvent and above mentioned binder dissolved in a solvent.

In the case of the heat setting type paste, a usual heat setting resin, for example, epoxy resin, thermosetting acrylic resin, thermosetting unsaturated polyester resin or the like is used as heat setting type binder. Thus a heat setting type phosphor paste comprises as main component a pulverized EL phosphor and the above mentioned heat setting type binder and a heat setting type insulative paste comprises as main component at least one high dielectric substance selected from pulverized inorganic high dielectric substances and organic high dielectric substances and above-mentioned heat setting type binder.

As a pulverized EL phosphor and an inorganic or organic high dielectric substances, aforementioned EL phosphor, inorganic or organic high dielectric substances are used.

These pastes may contain a spacer, a photosensitizer and/or other additives. Further, these pastes have a dielectric constant of not less than 10 at 1 KHz and 25° C. after being solidified. Usually, a pulverized EL phosphor is used in an amount of 150–800 parts by weight to 100 parts by weight of binder and a high dielectric substance is used in an amount of 200–700 parts by weight to 100 parts by weight of binder.

EL Element

According to the present invention, a EL element is formed by using said pastes for forming a luminescent layer and an insulator layer and by adopting a novel mode of solidification by use of radiation with the conventional solvent-drying or heat setting type solidification techniques, together.

Examples of the processes for producing EL element according to this invention will be described below with reference to the accompanying drawings.

FIG. 1 illustrates an EL element of the structure in which a luminescent layer and an insulator layer are disposed between a transparent electrode and a back electrode. For making such EL element, first an insulative paste solidifiable by radiation or an insulative paste solidifiable by heating for forming an insulator layer is coated on a back electrode 1 having an extended-out terminal 7. The coating is solidified by applying radiation or heating thereto to form an insulator layer. The thickness of this insulator layer is 5 to 50 μm, preferably 10 to 40 μm.

The amount of radiation used for solidifying said coating is preferably 1–100 megarads in the case of electron beam and preferably 1,000 to 10,000 millijoules/cm² in the case of ultraviolet ray. The time for radiation is preferably from seeveral seconds to less than 1 minute.

In the case of paste solidifiable by heating, a heating temperature of 80°–150° C., preferably 90°–120° C. and a heating time of 1–3 hrs are preferable.

Then a phosphor paste solidifiable by radiation or a phosphor paste solidifiable by heat for forming a luminescent layer (4) is coated on said insulator layer 3. When the phosphor paste solidifiable by heat is used, the coating is solidified by heating thereto to form a luminescent layer. A transparent conductive film 2 having an extended-out terminal 8 was attached to said phosphor paste layer using a heating roller in such a way that no air bubble would be trapped in the bonded area of the transparent electrode and paste layer. This transparent electrode comprises a synthetic resin film 2 having deposited on one side thereof an conductive transparent film 2'. It is attached to paste layer using pressure so that its conductive transparent film side will be bonded to the paste layer.

When the phosphor paste solidifiable by heating is used, the coating is coated on said insulator layer 3. After coating, a transparent electrode is attached to the paste layer as shown in the coating of the paste solidifiable by heating, then the laminate is irradiated via its transparent electrode side and solidified.

The thickness of the luminescent layer is 5 to 50 μm, preferably 10 to 40 μm.

A condition of radiation or heating is the same condition as in the formation of the insulator layer.

Thus obtained laminate is adhered with a synthetic resin film 5 such as a nylon film, with the external lead wire left extended out, for the purpose of ensuring water proof and adhesion, and further is sealed in its entirety with a fluorine resin film 6.

In the processes for producing EL element by changing the type of the phosphor paste forming the luminescent layer and the type of the insulative paste forming the insulator layer, there are offered the following four combinations for choice: (I) combination of the luminescent layer solidified by radiation using the phosphor paste of composition (1) and the insulator layer solidified by heating using a conventional insulative paste, (II) combination of the luminescent layer solidified by radiation using the phosphor paste of composition (2) and the insulator layer solidified by heating with using conventional insulative paste, (III) combination of the luminescent layer solidified by heating with a conventional conventional phosphor paste and an insulator layer solidified by radiation using an insulative paste of composition (3); and (IV) combination of the luminescent layer solidified by heating with a conventional phosphor paste and the insulator layer solidified by radiation using the insulative paste of composition (4).

In case of using as back electrode 1 a transparent electrode, for example, a polyethylene terephthalate film having deposited on one side thereof an ITO film (indium oxide/tin oxide film), there can be obtained a EL element capable of both sides luminescence.

The phosphor paste for forming a luminescent layer and the insulative paste for forming an insulator layer in an EL element can be coated to a desired thickness by an appropriate coating method such as spin coating, doctor blade coating, screen printing, etc.

The back electrode, transparent electrode, activator, coating material and sealing material used in the present invention are not subjected to any specific limitations; it is possible to use those known and employed in the art.

The EL element obtained as described above according to this invention produce a high luminance preferably a luminance of more than 20 cd/m², when an AC (100 V, 400 Hz) or DC (100 V) voltage is applied to their terminals.

Since the phosphor paste and the insulative paste in EL element according to this invention has a high dielectric constant of not less than 10, after being solidified, the EL element has a high luminance.

In EL element of the present invention, because the phosphor paste or the insulative paste solidifiable with radiation is used in either of luminescent layer or of insulator layer, the time required for producing the EL element is remarkably decreased and the coloring of the binder can be prevented too.

EXAMPLES

The present invention will hereinafter be described more in detail with reference to the examples thereof, but the invention is not limited to these examples but can as well be embodied in other forms without departing from the scope and spirit of the invention.

EXAMPLE 1

360 g of a pulverized EL phosphor comprising zinc sulfide added with an activator such as copper was mixed and well dispersed in 100 g of 2-(2-cyanoethoxy)ethyl acrylate (dielectric constant after solidified $\epsilon = 30$ (at 1 KHz and 25° C.), which is a monomer solidifiable by irradiation with electron beam, and the mixture was defoamed. Then 1 g of epoxy beads were dispersed as spacer in the suspension to prepare a phosphor paste for forming a luminescent layer of a EL element.

EXAMPLE 2

730 g of a pulverized EL phosphor comprising zinc sulfide as base material added with manganese as activator and further subjected to copper treatment on the surface was mixed and well dispersed in 100 g of 2-(2-cyanoethoxy)ethyl acrylate, which is a binder monomer solidifiable by irradiation with ultraviolet ray. The mixture was then added with 2 g of a photosensitizer (Irgacure 651 produced by Ciba Geigy Inc.), stirred for further mixing and defoamed to prepare a phosphor paste for forming a luminescent layer in an EL element.

EXAMPLE 3

360 g of a pulverized EL phosphor comprising zinc sulfide added with an activator such as copper was mixed and well dispersed in 100 g of 2-(2-cyanoethoxy)ethyl acrylate, a monomer solidifiable by irradiation with ultraviolet ray, followed by addition of 2 g of a photosensitizer (Irgacure 651), stirring and defoaming. Then 1 g of epoxy beads were dispersed as spacer in the suspension to prepare a phosphor paste for forming a luminescent layer of an EL element.

EXAMPLE 4

360 g of a pulverized EL phosphor comprising zinc sulfide added with an activator such as copper, 50 g of 2-(2-cyanoethoxy)ethyl acrylate which is a binder monomer solidifiable by irradiation with electron beam, and 50 g of 2-cyanoethyl acrylate (dielectric constant after solidified $\epsilon=17$ (at 1 KHz and 25° C.) were mixed and dispersed well, followed by further dispersion therein of 2 g of a photosensitizer (Irgacure 651) and 1 g of epoxy beads as spacer. Then the suspension was defoamed to prepare a phosphor paste for forming a luminescent layer of an EL element.

EXAMPLE 5

730 g of the pulverized EL phosphor used in Example 2 and 10 g of cyanoethylated poval (dielectric constant $\epsilon=20$, at 1 KHz and 25° C.) were mixed and well dispersed in 90 g of 2-(2-cyanoethoxy)ethyl acrylate, followed by further addition of 2 g of a photosensitizer (Irgacure 651), stirring and defoaming to prepare a phosphor paste for forming a luminescent layer of an EL element.

EXAMPLE 6

360 g of the pulverized EL phosphor used in Example 1 was mixed with 100 g of 2-cyanoethyl acrylate and 10 g of neopentyl glycol diacrylate and well dispersed, followed by defoaming. In this suspension were dispersed 1 g of epoxy beads as spacer and 2 g of Irgacure 651 as photosensitizer to prepare a phosphor paste for forming a luminescent layer of an EL element.

EXAMPLE 7

360 g of the pulverized EL phosphor used in Example 1 and 20 g of cyanoethylated pullulan ($\epsilon=19$ at 1 KHz and 25° C.) were mixed and well dispersed in 100 g of 2-cyanoethyl acrylate and 10 g of trimethylolpropane triacrylate, followed by defoaming. In this suspension were mixed 1 g of epoxy beads as spacer and 2 g of Irgacure 651 to prepare a phosphor paste for forming a luminescent layer of an EL element.

EXAMPLE 8

450 g of pulverized barium titanate was mixed and well dispersed in 100 g of 2-(2-cyanoethoxy)ethyl acrylate, which is a binder monomer solidifiable by irradiation with electron beam. The suspension was defoamed to prepare an insulative paste for forming an insulator layer of an EL element.

EXAMPLE 9

400 g of pulverized barium titanate was mixed and well dispersed in 100 g of 2-(2-cyanoethoxy)ethyl acrylate solidifiable by irradiation with ultraviolet ray. The suspension was further mixed with 2 g of Irgacure 651 as photosensitizer, stirred and defoamed to prepare an insulative paste for forming an insulator layer of an EL element.

EXAMPLE 10

450 g of pulverized barium titanate, 50 g of 2-(2-cyanoethoxy)ethyl acrylate, which is a binder monomer solidifiable by irradiation with electron beam, and 50 g of 2-cyanoethyl acrylate were mixed, well dispersed and defoamed to produce an insulative paste for forming an insulator layer of an EL element.

EXAMPLE 11

450 g of pulverized barium titanate was mixed with 80 g of 2-(2-cyanoethoxy)ethyl acrylate and 20 g of neopentyl glycol diacrylate, well dispersed and then defoamed to prepare an insulative paste for forming an insulator layer of an EL element.

EXAMPLE 12

400 g of pulverized barium titanate and 10 g of cyanoethylated poval were mixed and well dispersed in 90 g of 2-(2-cyanoethoxy)ethyl acrylate, followed by further mixing of 2 g of Irgacure 651 and defoaming to prepare an insulative paste for forming an insulator layer of an EL element.

EXAMPLE 13

450 g of pulverized barium titanate and 30 g of cyanoethylated saccharose ($\epsilon=35$, at 1 KHz and 25° C.) were mixed and well dispersed in 80 g of 2-(2-cyanoethoxy)ethyl acrylate and 20 g of trimethylolpropane triacrylate, and the suspension was then defoamed to prepare an insulative paste for forming an insulator layer of an EL element.

EXAMPLE 14

2 g of Irgacure 651 was mixed in 100 g of 2-(2-cyanoethoxy)ethyl acrylate and the mixture was defoamed to prepare an insulative paste for forming an insulator layer of an EL element.

Some examples of EL element using the insulative pastes and phosphor pastes according to the present invention are shown below.

EXAMPLE 15

FIG. 1 is referred to for the explanation. A 100 μm thick aluminum sheet was used as back electrode 1, and a 75 μm thick polyethylene terephthalate film 2 having an ITO film 2' deposited on one side thereof was used as transparent electrode. An insulative paste for forming an insulator layer of an EL element was prepared by mixing and well dispersing 450 g of pulverized barium titanate and 2 g of Irgacure 184 (made of Ciba Geiby Co.) as photosensitizer in 100 g of 2-(2-cyanoethoxy)ethyl acrylate and then defoaming. This paste was coated on the back electrode 1 having an extended out terminal 7 to form an insulative paste layer by a screen painting. Then the laminate was irradiated with ultra violet (UV) ray by the metal halide lamp of 4 KW for 10 seconds, thereby the binder paste was solidified to form an insulator layer 3. The thickness of this layer was 3.5 μm. Then 360 g of a pulverized EL phosphor was dispersed in 400 g of dimethylformamide solution comprising 100 g cyanoethylated poval and after stirring, this dispersion was defoamed to form a phosphor paste. This paste was coated on the insulator layer by a screen painting. Then the laminate was dried at 120° C. for 1 hr., thereby a luminescent layer having 40 μm of thickness was formed.

A transparent conductive film 2 having an extended-out terminal 8 was attached to said phosphor paste layer using a heating roller in such a way that no air bubble would be trapped in the bonded areas of the transparent electrode and paste layer. Then the laminate was adhered with a nylon 6/nylon 12 composite film 5, with the lead wire left extended out, for the purpose of ensuring water proof and adhesion, and further sealed entirely with a fluorine resin film 6. This dispersion type EL element produced a high luminance of 80 cd/m$^2$ when an AC voltage of 100 V and 400 Hz was applied thereto.

EXAMPLE 16

FIG. 1 of the accompanying drawing is referred to for the explanation.

400 g of a pulverized barium titanate was added in 400 g of dimethyl formamide solution comprising 100 g of cyanoethylated poval, this dispersion was stirred and defoamed and thus an insulative paste was obtained.

The paste was coated on the back electrode 1 which is 100 μm of Al sheet and have an extended-out terminal 7 by screen printing and dried at 120° C. for 2 hours, thereby an insulator layer having 40 μm of thickness was formed.

360 g of pulverized EL phosphor, 2 g of Irgacure 184 and epoxy beads as a spacer were added in 100 g of 2-(2-cyanoethoxy) ethyl acrylate, stirred and defoamed to form a phosphor paste.

The paste was coated on the insulator layer by screen printing. Then a transparent electrode of a 75 μm thick polyethylene telephthalate 2 which have an ITO 2' film deposited on one side thereof and have an extended-out terminal was attached to the phosphor layer in such a way that no air bubble would be trapped in the bonded areas of the transparent electrode and paste layer. Then the laminate was irradiated with UV ray by the metal halide lamp of 4 KW for 10 seconds, thereby the phosphor paste was solidified to form a luminescent layer: The thickness of the luminescent layer was 50 μm.

Then the laminate was adhered with a nylon 6/nylon 12 composite film, with the lead wire left extended out, for the purpose of ensuring water proof and adhesion, and further sealed entirely with a fluorine resin film 6.

This EL element produced a high luminance of 70 cd/m$^2$ when an AC voltage of 100 V and 400 Hz was applied thereto.

EXAMPLE 17

450 g of pulverized barium titanate, 100 g of UV resin A [a mixture of 40 g of epoxy acrylate (EBECRYL 600), 20 g of 2-hydroxyethylacrylate and 40 g of cyanoethylated saccharose] which has dielectric constant after solidified $\epsilon=13$ at 1 KHz and 25° C., and 2 g of Irgacure 184 were stirred and defoamed to form an insulative paste.

An EL element was produced by following the same procedure as example 15 except for using above-mentioned insulatative paste and the thickness of an insulator layer was 30 μm.

The EL element produced a luminance of 60 cd/m$^2$ when an AC voltage of 100 V and 400 Hz was applied thereto.

EXAMPLE 18

360 g of pulverized EL phosphor, 100 g of UV resin B [a mixture of 30 g of urethan acrylate (UV-7000B made of Nihon Gosei KK), 30 g of 2-phenoxyethylacrylate and 40 g of cyanoethylated saccharose], which has dielectric constant after solidified $\epsilon=16$ at 1 KHz and 25° C., 2 g of Irgacure 184 and epoxy beads as a spacer were mixed, stirred and defoamed to form a EL phosphor paste.

An EL element was produced by following the same procedure as Example 16 except for using above-mentioned phosphor paste and the thickness of a luminescent layer was 45 μm.

The EL element produced a luminance of 65 cd/m$^2$ when an AC voltage of 100 V and 400 Hz was applied thereto.

EXAMPLE 19

450 g of a pulverized barium titanate was added to the mixture of 350 g of epoxy resin (EPIKOTE 828 made of Shell Co., Ltd.), 30 g of methylhexahydrophthalic acid anhydride, 1 g of 2-ethyl-4-methyl imidazol and 40 g of cyanoethylated saccharose, stirred and defoamed to form a heat setting type insulative paste.

The paste was coated on the back electrode 1 which is 10 μm of Al sheet and have an extended-out terminal 7 by screen printing and heat set at 100°-120° C. for 1 hr, thereby an insulator layer having 30 μm of thickness was formed.

360 g of pulverized EL phosphor, 100 g of UV Resin A and 2 g of Irgacure 184 were stirred and defoamed to form a phosphor paste.

The phosphor paste was coated on the insulator layer by screen printing and an EL element was produced by following the same procedure as Example 16.

The EL element produced a high luminance of 55 cd/m$^2$ when AC voltage of 100 V and 400 Hz was applied thereto.

EXAMPLE 20

A mixture of 360 g of pulverized EL phosphor, 100 g of 2-(2-cyanoethoxy)ethyl acrylate and 2 g of Irgacure 184 were stirred and defoamed to form a phosphor paste.

An EL element was produced by following the same procedure as Example 19 except for using above-mentioned phosphor paste and the thickness of a layer was 55 μm and of an insulator layer was 35 μm.

The EL element produced a luminance of 50 cd/m$^2$ when an AC voltage of 100 V and 400 Hz was applied thereto.

COMPARATIVE EXAMPLE

A solvent type EL phoshpor paste used in Example 15 and a solvent type insulative paste used in Example 16 were used and a luminescent layer and an insulator layer were formed in same way as described in Example 15, Example 16 and thus EL element was obtained.

The time required for the production of EL element was about 1-3 hrs. more than Example 15-20 and EL element obtained had a slight color.

What is claimed is:

1. A phosphor paste having a dielectric constant of not less than 10 at 1 KHz and 25° C. when solidified, for forming a luminescent layer of an electroluminescent element, said paste comprising:
   a) a pulverized electroluminescent phosphor,
   b) spacer particles having a particle size of from 10 to 50 μm which constantly maintain the thickness of the luminescent layer, and
   c) at least one monomeric compound, solidifiable by radiation and having a high dielectric constant when solidified, of not less than 10 at KHz and 25° C.

2. The phosphor paste according to claim 1 wherein said monomeric compound solidifiable by radiation is selected from the group consisting of methacrylic esters having a cyanoalkyl group, acrylic esters having a cyanoalkyl group, methacrylic esters having a cyanoalkoxyalkyl group, acrylic esters having a cyanoalkoxyalkyl group, methacrylic acid amides having a cyanoalkyl group and acrylic acid amides having a cyanoalkyl group.

3. The phosphor paste according to claim 1 or 2 wherein the spacer particles are made of a material selected from the group consisting of an epoxy resin, a polystyrene resin, a nylon resin and glass.

4. The phosphor paste according to claim 1 which also contains a photosensitizer for the compound solidifiable by radiation.

* * * * *